United States Patent
Archer et al.

(10) Patent No.: US 7,805,546 B2
(45) Date of Patent: Sep. 28, 2010

(54) CHAINING DIRECT MEMORY ACCESS DATA TRANSFER OPERATIONS FOR COMPUTE NODES IN A PARALLEL COMPUTER

(75) Inventors: Charles J. Archer, Rochester, MN (US); Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 11/829,325

(22) Filed: Jul. 27, 2007

(65) Prior Publication Data

US 2009/0031055 A1    Jan. 29, 2009

(51) Int. Cl.
G06F 13/28 (2006.01)
G06F 13/00 (2006.01)
G06F 15/16 (2006.01)
G06F 15/167 (2006.01)

(52) U.S. Cl. .................. 710/22; 710/35; 709/212; 709/217; 709/248; 712/11; 712/28

(58) Field of Classification Search .................. None
See application file for complete search history.

(56) References Cited

U.S. PATENT DOCUMENTS

| | | | |
|---|---|---|---|
| 5,050,162 A | | 9/1991 | Golestani |
| 5,617,537 A | * | 4/1997 | Yamada et al. ............... 709/214 |
| 5,680,116 A | | 10/1997 | Hashimoto et al. |
| 5,790,530 A | * | 8/1998 | Moh et al. .................. 370/363 |
| 5,954,794 A | * | 9/1999 | Fishler et al. ............... 709/213 |
| 6,072,781 A | * | 6/2000 | Feeney et al. ............... 370/282 |
| 6,105,122 A | | 8/2000 | Muller et al. |
| 7,155,541 B2 | * | 12/2006 | Ganapathy et al. ............ 710/24 |
| 2003/0233497 A1 | * | 12/2003 | Shih ............................ 710/22 |
| 2005/0114561 A1 | * | 5/2005 | Lu et al. ...................... 710/24 |
| 2005/0198113 A1 | * | 9/2005 | Mohamed et al. ........... 709/203 |
| 2006/0045005 A1 | | 3/2006 | Blackmore et al. |
| 2006/0045109 A1 | | 3/2006 | Blackmore et al. |
| 2006/0047771 A1 | | 3/2006 | Blackmore et al. |
| 2006/0056405 A1 | | 3/2006 | Chang et al. |

(Continued)

OTHER PUBLICATIONS

U.S. Appl. No. 11/776,707, filed Jul. 12, 2007, Blocksome.

(Continued)

Primary Examiner—Henry W. H. Tsai
Assistant Examiner—Michael Sun
(74) Attorney, Agent, or Firm—Biggers & Ohanian, LLP

(57) ABSTRACT

Methods, systems, and products are disclosed for chaining DMA data transfer operations for compute nodes in a parallel computer that include: receiving, by an origin DMA engine on an origin node in an origin injection FIFO buffer for the origin DMA engine, a RGET data descriptor specifying a DMA transfer operation data descriptor on the origin node and a second RGET data descriptor on the origin node, the second RGET data descriptor specifying a target RGET data descriptor on the target node, the target RGET data descriptor specifying an additional DMA transfer operation data descriptor on the origin node; creating, by the origin DMA engine, an RGET packet in dependence upon the RGET data descriptor, the RGET packet containing the DMA transfer operation data descriptor and the second RGET data descriptor; and transferring, by the origin DMA engine to a target DMA engine on the target node, the RGET packet.

18 Claims, 8 Drawing Sheets

U.S. PATENT DOCUMENTS

2006/0075057 A1* 4/2006 Gildea et al. ................ 709/212
2006/0206635 A1* 9/2006 Alexander et al. ............ 710/22
2006/0253619 A1* 11/2006 Torudbakken et al. ......... 710/31
2008/0109573 A1* 5/2008 Leonard et al. ............... 710/24
2008/0222317 A1* 9/2008 Go et al. ...................... 710/22

OTHER PUBLICATIONS

U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action Dated Sep. 18, 2009 in U.S. Appl. No. 11/829,334.
Office Action Dated Sep. 15, 2009 in U.S. Appl. No. 11/829,339.
Office Action Dated Nov. 24, 2009 in U.S. Appl. No. 11/829,325.
Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.

* cited by examiner

CHAINING DIRECT MEMORY ACCESS DATA TRANSFER OPERATIONS FOR COMPUTE NODES IN A PARALLEL COMPUTER

RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for chaining Direct Memory Access ('DMA') data transfer operations for compute nodes in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather operation.

In the current art, compute nodes typically communicate through such data communications networks using complex communications protocols that often specify the use of multiple Direct Memory Access ('DMA') data transfer operations. Each data transfer operation typically represents a stage of data communications between compute nodes according the communications protocol. During such data communications, one or more processing cores on the compute nodes are typically used to advance the communications state according to the protocol. The drawback to utilizing a processing core on a compute node to advance the communications state according to the protocol is that using a processing core to advance the communications state reduces the amount of processing resources available for performing other processing tasks. As such, readers will appreciate that room for improvement exists in data communications between compute nodes in a parallel computer by, in particular, chaining Direct Memory Access ('DMA') data transfer operations for compute nodes in a parallel computer.

SUMMARY OF THE INVENTION

Methods, systems, and products are disclosed for chaining Direct Memory Access ('DMA') data transfer operations for compute nodes in a parallel computer that include: receiving, by an origin DMA engine on an origin compute node in an origin injection First-In-First-Out ('FIFO') buffer for the origin DMA engine, a remote get ('RGET') data descriptor that specifies a DMA transfer operation data descriptor on the origin compute node and a second RGET data descriptor on the origin compute node, the second RGET data descriptor specifying a target RGET data descriptor on the target compute node, the target RGET data descriptor specifying an additional DMA transfer operation data descriptor on the origin compute node; creating, by the origin DMA engine, an RGET packet in dependence upon the RGET data descriptor, the RGET packet containing the DMA transfer operation data descriptor and the second RGET data descriptor; and transferring, by the origin DMA engine to a target DMA engine on the target compute node, the RGET packet.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
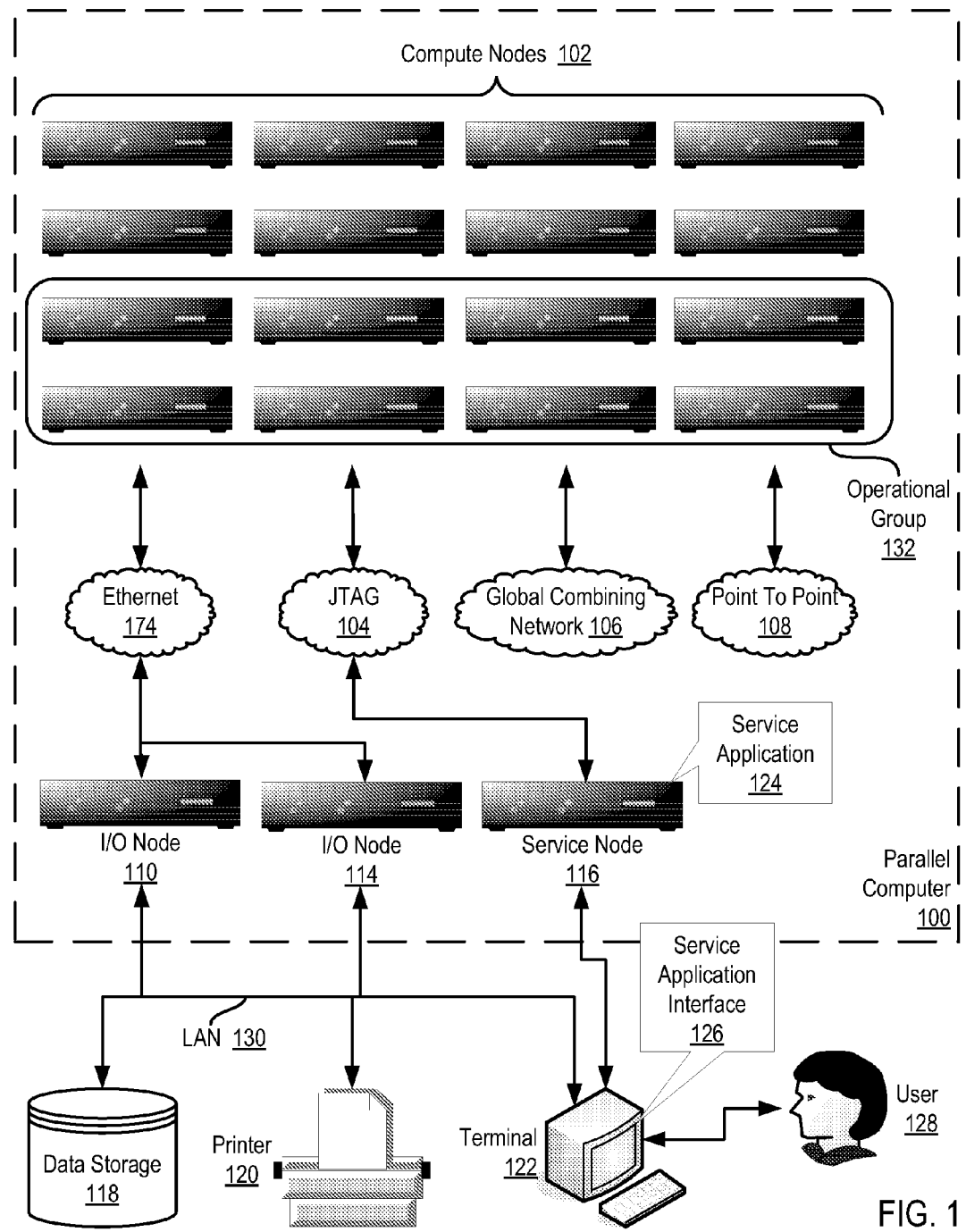
FIG. 1 illustrates an exemplary system for chaining DMA data transfer operations for compute nodes in a parallel computer according to embodiments of the present invention.

Exemplary methods, systems, and computer program products for chaining DMA data transfer operations for compute nodes in a parallel computer according to embodiments of the present invention are described with reference to the accompanying drawings, beginning with FIG. 1. FIG. 1 illustrates an exemplary system for chaining DMA data transfer operations for compute nodes in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |

-continued

| MPI_LXOR | logical exclusive or |
|---|---|
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for chaining DMA data transfer operations for compute nodes in a parallel computer according to embodiments of the present invention. The system of FIG. 1 operates generally for chaining DMA data transfer operations for compute nodes in a parallel computer according to embodiments of the present invention as follows: An origin DMA engine on an origin compute node receives, in an origin injection First-In-First-Out ('FIFO') buffer for the origin DMA engine, a remote get ('RGET') data descriptor that specifies a DMA transfer operation data descriptor on the origin compute node and a second RGET data descriptor on the origin compute node. The second RGET data descriptor specifies a target RGET data descriptor on the target compute node. The target RGET data descriptor specifies an additional DMA transfer operation data descriptor on the origin compute node. The origin DMA engine creates an RGET packet in dependence upon the RGET data descriptor. The RGET packet contains the DMA transfer operation data descriptor and the second RGET data descriptor. The origin DMA engine then transfers the RGET packet to a target DMA engine on the target compute node. Readers will note that the origin compute node is a compute node originating the data descriptors and initiating data communications with another compute node, that is the target compute node.

Turning now to the perspective of the target compute node, the system of FIG. 1 may also operate generally for chaining DMA data transfer operations for compute nodes in a parallel computer according to embodiments of the present invention as follows: The target DMA engine receives the RGET packet from the origin DMA engine. The target DMA engine injects the DMA transfer operation data descriptor and the second RGET data descriptor in a target injection FIFO buffer for the target DMA engine. The target DMA engine performs the DMA transfer operation in dependence upon the DMA transfer operation data descriptor. The target DMA engine creates a second RGET packet in dependence upon the second RGET data descriptor. The second RGET packet contains the target RGET data descriptor. The target DMA engine transfers the second RGET packet to the origin DMA engine.

Turning back to the perspective of the origin compute node, the system of FIG. 1 may also operate generally for chaining DMA data transfer operations for compute nodes in a parallel computer according to embodiments of the present invention as follows: The origin DMA engine receives the second RGET packet from the target DMA engine. The origin DMA engine injects the target RGET data descriptor in the origin injection FIFO buffer. The origin DMA engine creates a third RGET packet in dependence upon the target RGET data descriptor. The third RGET packet contains the additional DMA transfer operation data descriptor specifying an additional DMA transfer operation to be performed by the target DMA engine. The origin DMA engine then transfers the third RGET packet to the target DMA engine.

A data descriptor is a data structure that specifies a particular DMA data transfer to be carried out by a DMA engine. A data descriptor may specify the type of DMA transfer operation used to transfer data between compute nodes such as, for example, a direct put data transfer operation or a memory FIFO data transfer operation. A data descriptor may also specify the packet headers for the packets used to transmit the data through a network.

A direct put operation is a mode of transferring data using DMA engines, typically a DMA engine on an origin node and a DMA engine on a target node. A direct put operation allows data to be transferred and stored to a particular compute node with little or no involvement from the compute node's processor. To effect minimal involvement from the compute node's processor in the direct put operation, the DMA engine of the sending compute node transfers the data to the DMA engine on the receiving compute node along with a specific identification of a storage location on the receiving compute node. The DMA engine on the receiving compute node then stores the data in the storage location specified by the sending compute node's DMA engine. The sending compute node's DMA engine is aware of the specific storage location on the receiving compute node because the specific storage location for storing the data on the receiving compute node has been previously provided to the DMA engine of the sending compute node.

A memory FIFO data transfer operation is a mode of transferring data using DMA engines, typically a DMA engine on an origin node and a DMA engine on a target node. In a memory FIFO data transfer operation, data is transferred along with a data descriptor describing the data from one DMA engine to another DMA engine. The DMA engine receiving the data and its descriptor in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

As mentioned above, the origin compute node and the target compute node use RGET packets to pass data descriptors between the compute nodes. An RGET packet is created by a DMA engine upon processing a data descriptor that specifies a remote get operation. A remote get operation is a DMA control operation that allows a compute node to retrieve data from another compute node without involving the processor on the compute node providing the data by injecting a data descriptor into the other computer node's DMA FIFO buffers.

The arrangement of nodes, networks, and I/O devices making up the exemplary system illustrated in FIG. 1 are for explanation only, not for limitation of the present invention. Data processing systems capable of chaining DMA data transfer operations for compute nodes in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of chaining DMA data transfer operations for compute nodes in a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Chaining DMA data transfer operations for compute nodes in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of chaining DMA data transfer operations for compute nodes according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
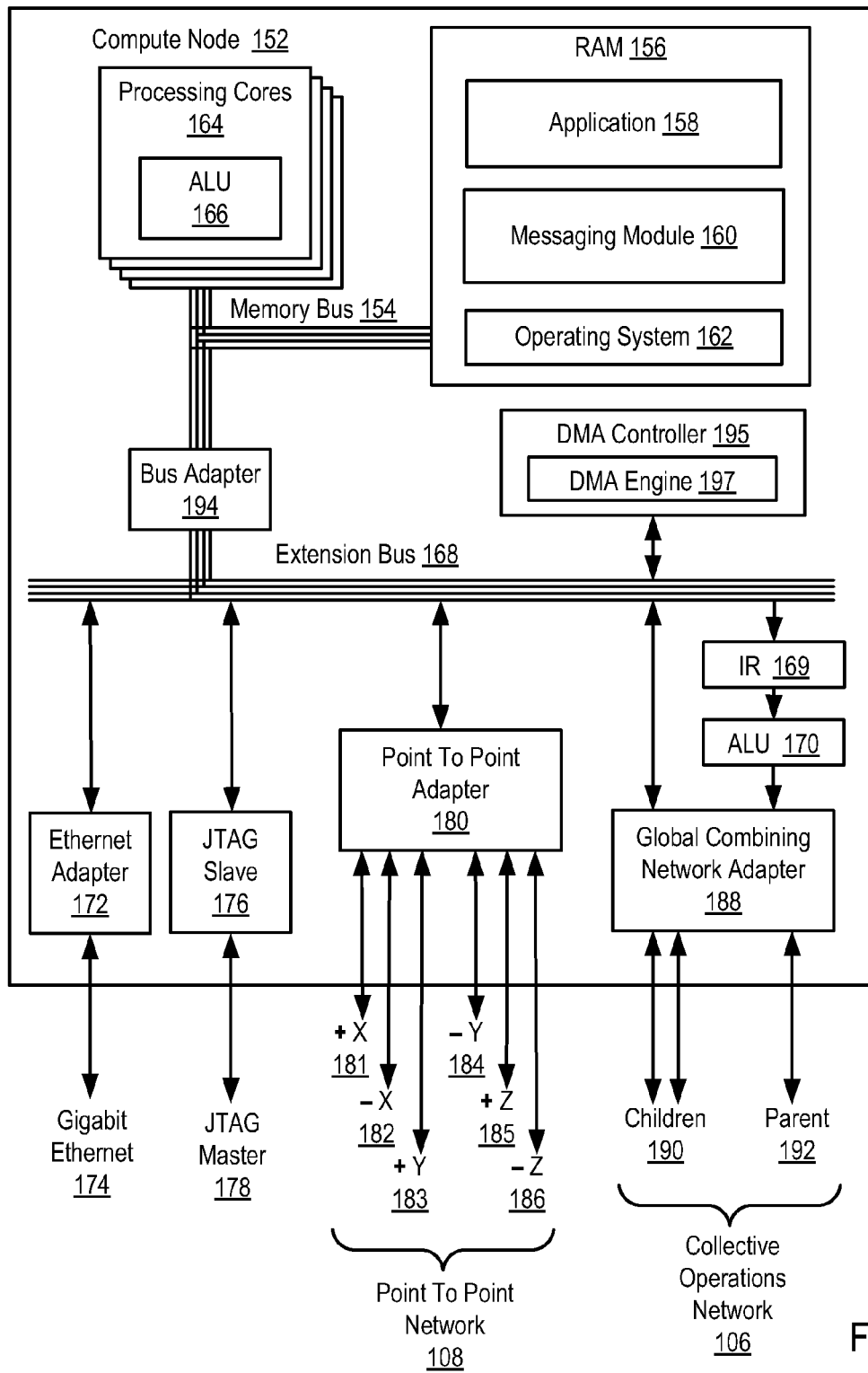
FIG. 2 sets forth a block diagram of an exemplary compute node useful in a parallel computer capable of chaining DMA data transfer operations for compute nodes according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for chaining DMA data transfer operations for compute nodes in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in chaining DMA data transfer operations for compute nodes in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

The DMA engine (197) of FIG. 2 is improved for chaining DMA data transfer operations for compute nodes in a parallel computer according to embodiments of the present invention. The DMA engine (197) of FIG. 2 operates generally for chaining DMA data transfer operations for compute nodes in a parallel computer according to embodiments of the present invention by: receiving, in an origin injection First-In-First-Out ('FIFO') buffer for the origin DMA engine, a remote get ('RGET') data descriptor that specifies a DMA transfer operation data descriptor on the origin compute node and a second RGET data descriptor on the origin compute node, the second RGET data descriptor specifying a target RGET data descriptor on the target compute node, the target RGET data descriptor specifying an additional DMA transfer operation data descriptor on the origin compute node; creating an RGET packet in dependence upon the RGET data descriptor, the RGET packet containing the DMA transfer operation data descriptor and the second RGET data descriptor; and transferring the RGET packet to a target DMA engine on the target compute node. The DMA engine (197) of FIG. 2 may also operates generally for chaining DMA data transfer operations for compute nodes in a parallel computer according to embodiments of the present invention by: receiving a second RGET packet from the target DMA engine, the second RGET packet containing the target RGET data descriptor; injecting the target RGET data descriptor in the origin injection FIFO buffer; creating a third RGET packet in dependence upon the target RGET data descriptor, the third RGET packet containing the additional DMA transfer operation data descriptor specifying an additional DMA transfer operation to be performed by the target DMA engine; and transferring the third RGET packet to the target DMA engine.

Figure 3A:
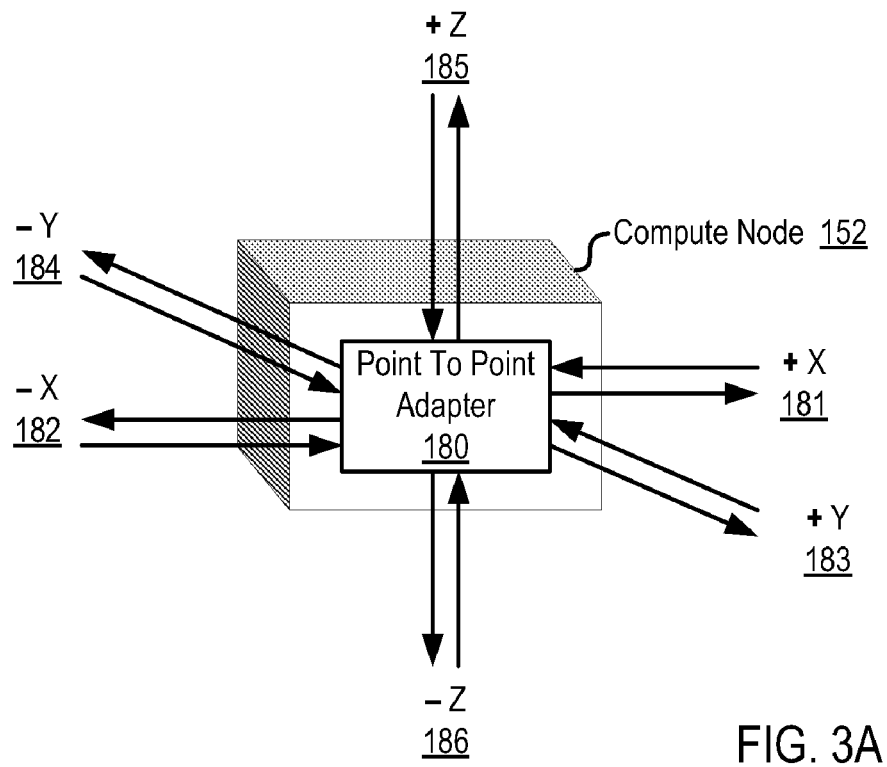
FIG. 3A illustrates an exemplary Point To Point Adapter useful in systems capable of chaining DMA data transfer operations for compute nodes in a parallel computer according to embodiments of the present invention.

For further explanation, FIG. 3A illustrates an exemplary Point To Point Adapter (180) useful in systems capable of chaining DMA data transfer operations for compute nodes in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
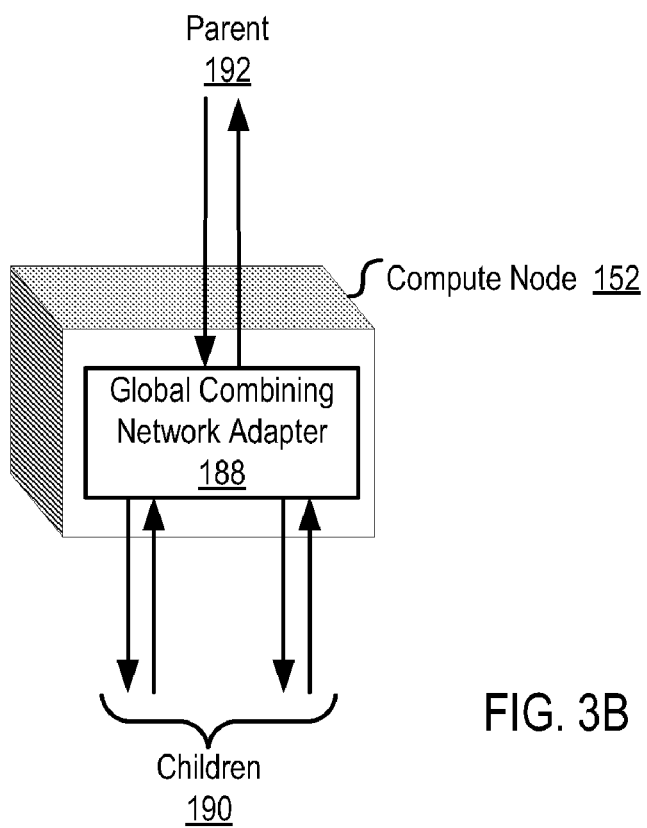
FIG. 3B illustrates an exemplary Global Combining Network Adapter useful in systems capable of chaining DMA data transfer operations for compute nodes in a parallel computer according to embodiments of the present invention.

For further explanation, FIG. 3B illustrates an exemplary Global Combining Network Adapter (188) useful in systems capable of chaining DMA data transfer operations for compute nodes in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
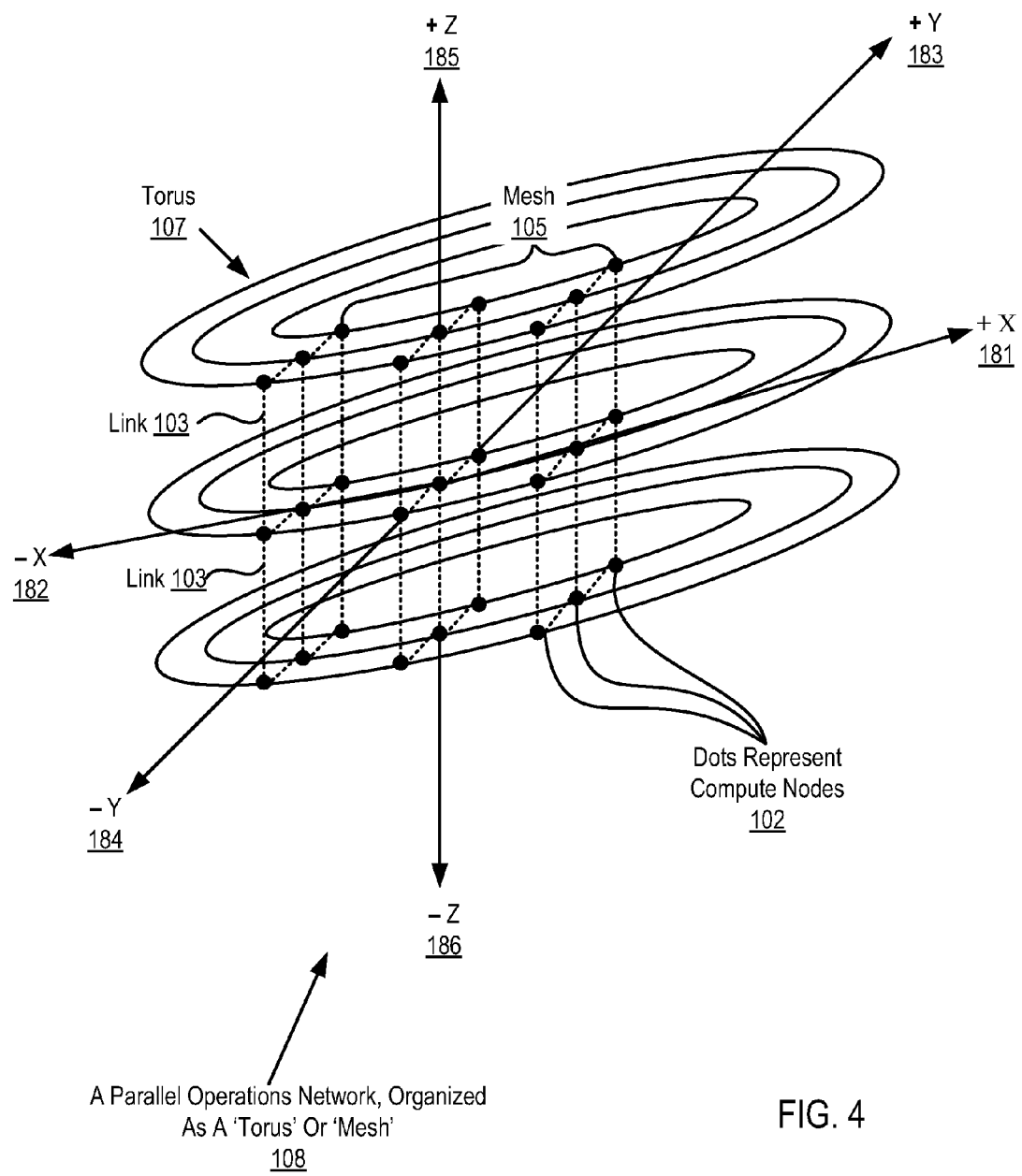
FIG. 4 sets forth a line drawing illustrating an exemplary data communications network optimized for point to point operations useful in systems capable of chaining DMA data transfer operations for compute nodes in a parallel computer in accordance with embodiments of the present invention.

For further explanation, FIG. 4 sets forth a line drawing illustrating an exemplary data communications network (108) optimized for point to point operations useful in systems capable of chaining DMA data transfer operations for compute nodes in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in chaining DMA data transfer operations for compute nodes in a parallel computer in accordance with embodiments of the present invention may contain only a few compute nodes or may contain thousands of compute nodes.

Figure 5:
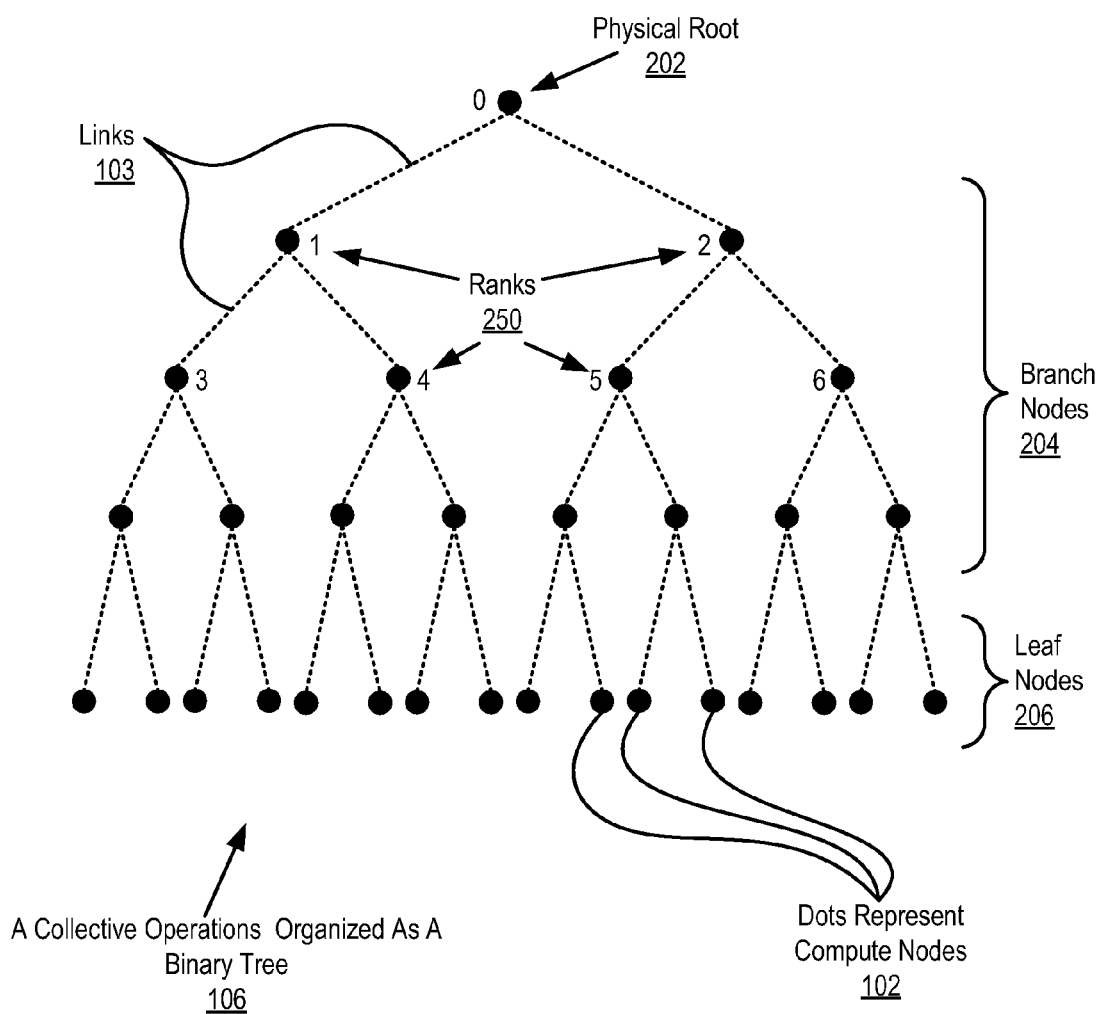
FIG. 5 sets forth a line drawing illustrating an exemplary data communications network optimized for collective operations useful in systems capable of chaining DMA data transfer operations for compute nodes in a parallel computer in accordance with embodiments of the present invention.

For further explanation, FIG. 5 sets forth a line drawing illustrating an exemplary data communications network (106) optimized for collective operations useful in systems capable of chaining DMA data transfer operations for compute nodes in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for chaining DMA data transfer operations for compute nodes in a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
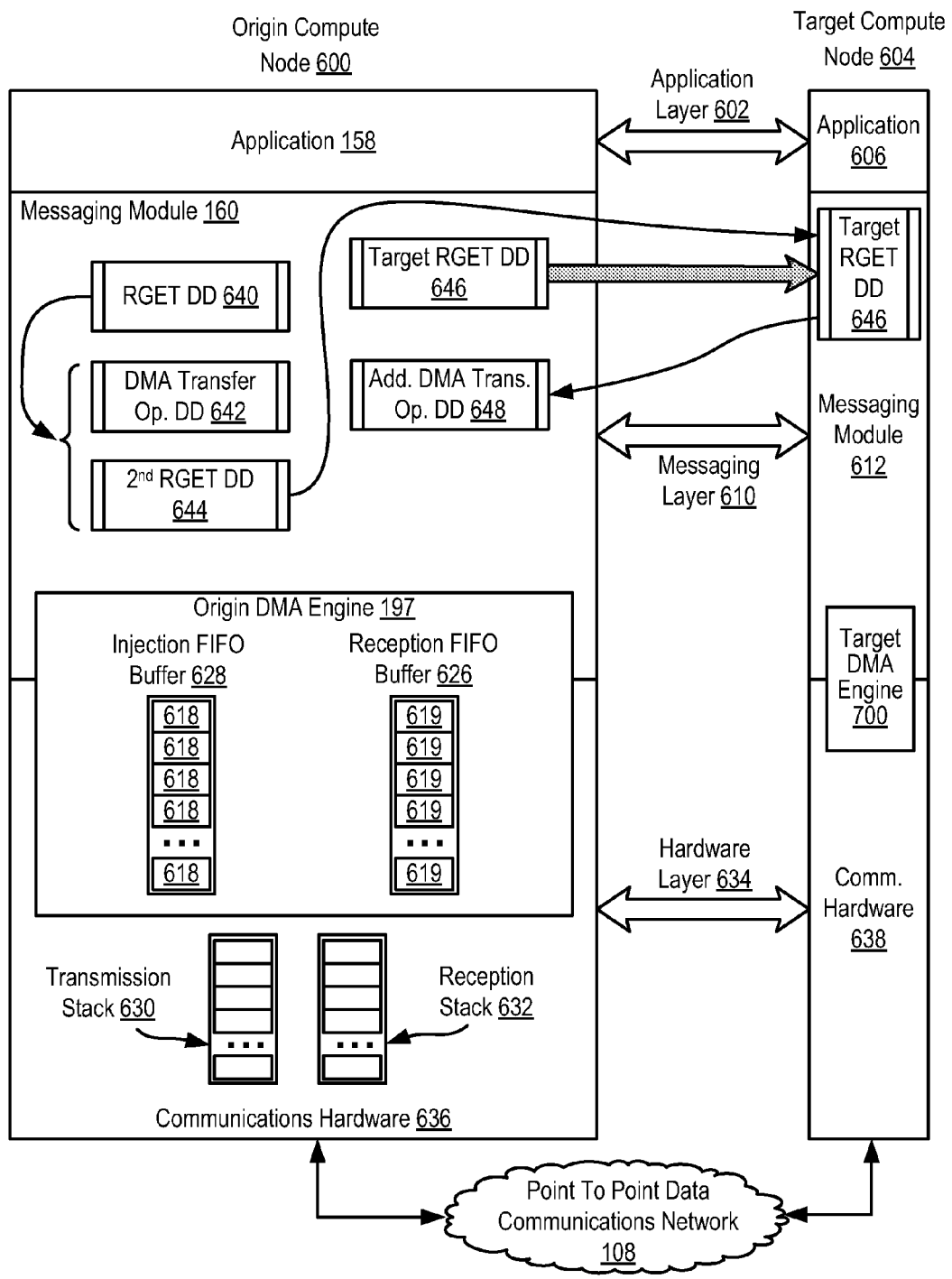
FIG. 6 sets forth a block diagram illustrating an exemplary communications architecture illustrated as a protocol stack useful in chaining DMA data transfer operations for compute nodes in a parallel computer according to embodiments of the present invention.

For further explanation, FIG. 6 sets forth a block diagram illustrating an exemplary communications architecture illustrated as a protocol stack useful in chaining DMA data transfer operations for compute nodes in a parallel computer according to embodiments of the present invention. The exemplary communications architecture of FIG. 6 sets forth two compute nodes, an origin compute node (600) and a target compute node (604). Only two compute nodes are illustrated in the example of FIG. 6 for ease of explanation and not for limitation. In fact, chaining DMA data transfer operations for compute nodes in a parallel computer according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600) and an application (606) installed on the target compute node (604).

In the example of FIG. 6, the applications (158, 606) typically communicate by passing messages. Data communications between applications (158, 606) are effected using messaging modules (160, 612) installed on each of the compute nodes (600, 604). Applications (158, 606) may communicate by invoking function of an application programming interfaces ('API') exposed by the application messaging modules (606, 612). For the application (158) to transmit a message to the application (606), the application (158) of FIG. 6 may invoke a function of an API for messaging module (160) that passes a buffer identifier of an application buffer containing the application message to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158 and 606) in the application layer (602). In the example of FIG. 6, the messaging layer (610) is composed of messaging module (160) installed on the origin compute node (600) and messaging module (612) installed on the target compute node (604).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 604) on the physical network medium. The hardware layer (634) of FIG. 6 is composed of communications hardware (636) of the origin compute node (600), communications hardware (638) of the target compute node (636), and the data communications network (108) connecting the origin compute node (600) to the target compute node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in chaining DMA data transfer operations for compute nodes in a parallel computer according to embodiments of the present invention may often provide messaging layer interfaces and also implement communications according to some aspects of the communication hardware layer (634). The exemplary DMA engine (197) of FIG. 6 includes an injection first-in-first-out ('FIFO') buffer (628) for storing data descriptors (618) that specify DMA transfer operations for transferring data. The exemplary DMA engine (197) of FIG. 6 also includes a reception FIFO buffer (626) used to receive message packets (619) from other DMA engines on other compute nodes. Although FIG. 6 only illustrates a single injection FIFO buffer (628) and a single reception FIFO buffer (626), readers will note that a DMA engine may have access to any number of injection FIFO buffers and reception FIFO buffers.

The origin DMA engine (197) of FIG. 6 is improved for chaining DMA data transfer operations for compute nodes in a parallel computer according to embodiments of the present invention. The origin DMA engine (197) of FIG. 6 operates generally for chaining DMA data transfer operations for compute nodes in a parallel computer according to embodiments of the present invention by: receiving, in the origin injection FIFO buffer (628), a remote get ('RGET') data descriptor (640) that specifies a DMA transfer operation data descriptor (642) on the origin compute node (600) and a second RGET data descriptor (644) on the origin compute node (600), the second RGET data descriptor (644) specifying a target RGET data descriptor (646) on the target compute node (604), the target RGET data descriptor (646) specifying an additional DMA transfer operation data descriptor (648) on the origin compute node (600); creating an RGET packet in dependence upon the RGET data descriptor (640), the RGET packet containing the DMA transfer operation data descriptor (642) and the second RGET data descriptor (644); and transferring the RGET packet to a target DMA engine (700) on the target compute node (604). Readers will note that although the target RGET data descriptor (646) resides on the target compute node (604), a processing core on the origin compute node (600) may create the target RGET data descriptor (646) when the other data descriptors (640, 642, 644, 648) are created and transfer the target RGET data descriptor (646) to the target compute node (604).

The target DMA engine (700) of FIG. 6 is also improved for chaining DMA data transfer operations for compute nodes in a parallel computer according to embodiments of the present invention. The target DMA engine (700) of FIG. 6 may operate generally for chaining DMA data transfer operations for compute nodes in a parallel computer according to embodiments of the present invention by: receiving the RGET packet from the origin DMA engine (197) that contains the DMA transfer operation data descriptor (642) and the second RGET data descriptor (644); injecting the DMA transfer operation data descriptor (642) and the second RGET data descriptor (644) in a target injection FIFO buffer for the target DMA engine; performing the DMA transfer operation in dependence upon the DMA transfer operation data descriptor (642); creating a second RGET packet in dependence upon the second RGET data descriptor (644), the second RGET packet containing the target RGET data descriptor (646); and transferring the second RGET packet to the origin DMA engine (197).

Turning back to the origin DMA engine (197), the origin DMA engine (197) of FIG. 6 may also operates generally for chaining DMA data transfer operations for compute nodes in a parallel computer according to embodiments of the present invention by: receiving the second RGET packet from the target DMA engine (700) that contains the target RGET data descriptor (646); injecting the target RGET data descriptor (646) in the origin injection FIFO buffer (628); creating a third RGET packet in dependence upon the target RGET data descriptor (646), the third RGET packet containing the additional DMA transfer operation data descriptor (648) specifying an additional DMA transfer operation to be performed by the target DMA engine; and transferring the third RGET packet to the target DMA engine (700). Upon receiving the third RGET packet that contains the additional DMA transfer operation data descriptor (648), the target DMA engine (700) of FIG. 6 may inject the additional DMA transfer operation data descriptor (648) into a target injection FIFO buffer and perform the additional DMA transfer operation.

Readers will note that the data descriptors (640, 642, 644, 646, 648) form a chain of DMA transfer operations that are performed by the origin DMA engine (197) on the origin compute node (600) and by the target DMA engine (700) on the target compute node (604). In the example of FIG. 6, the five data descriptors (640, 642, 644, 646, 648) operate to form a chain of two DMA transfer operations performed by the target compute node (604) to transfer data from the target compute node (604) to the origin compute node (600). The first data descriptor, the RGET data descriptor (640) is used to initiate processing of the DMA transfer operation chain by the origin DMA engine (197). As mentioned above, the RGET data descriptor (640) instructs the origin DMA engine (197) to send an RGET packet to the target DMA engine (700) that includes the DMA transfer operation data descriptor (642) and the second RGET data descriptor (644).

Upon receiving the RGET packet, the target DMA engine (700) injects the data descriptors (642, 644) into a target injection FIFO buffer and processes the data descriptors (642, 644). Processing the DMA transfer operation data descriptor (642) causes the target DMA engine (700) to perform the first DMA transfer operation in the DMA transfer operation chain. The DMA transfer operation may be implemented, for example, as a memory FIFO operation or a direct put operation. Processing the second RGET data descriptor (644) causes the target DMA engine (700) to create a second RGET packet that includes the target RGET data descriptor (646) on the target compute node (604) and transmit the second RGET packet to the origin DMA engine (197).

Upon receiving the second RGET packet, the origin DMA engine (197) injects the target RGET data descriptor (646) in the origin injection FIFO buffer (628). Because the target RGET data descriptor (646) specifies the additional DMA transfer operation data descriptor (648), processing the target RGET data descriptor (646) causes the origin DMA engine (197) to create a third RGET packet that includes the additional DMA transfer operation data descriptor (648) and transmit the third RGET packet to the target DMA engine (700).

When the target DMA engine (700) receives the third RGET packet, the target DMA engine (700) injects the additional DMA transfer operation data descriptor (648) in a target injection FIFO buffer. Processing the additional DMA transfer operation data descriptor (648) causes the target DMA engine (700) to perform the second DMA transfer operation in the DMA transfer operation chain. The additional DMA transfer operation may be implemented, for example, as a memory FIFO operation or a direct put operation.

Readers will note that although only two DMA transfer operations are chained together in the example of FIG. 6, any number of DMA transfer operations may be chained together in chaining DMA data transfer operations for compute nodes in a parallel computer according to embodiments of the present invention. The number of additional DMA transfer operation chained together may be increased by increasing the number of DMA transfer data descriptors contained in each RGET packet sent from the origin compute node (600) to the target compute node (604). Because packet size limits the number of data descriptors capable of being stored in each network packet, for each additional RGET packet needed to transfer DMA transfer data descriptors from the origin compute node (600) to the target compute node (604), an additional RGET data descriptor is required on the origin compute node (600), and an additional RGET data descriptor is required on the target compute node (604).

The additional RGET data descriptor required on the target compute node (604) is used to create an RGET packet for injecting the additional data descriptors on the origin compute node (600) into a target FIFO buffer on the target compute node (604). The additional RGET data descriptor required on the origin compute node (600) is used to create an additional RGET packet for injecting the additional RGET data descriptor required on the target compute node (604) into the origin FIFO buffer (628) on the origin compute node (600).

Figure 7:
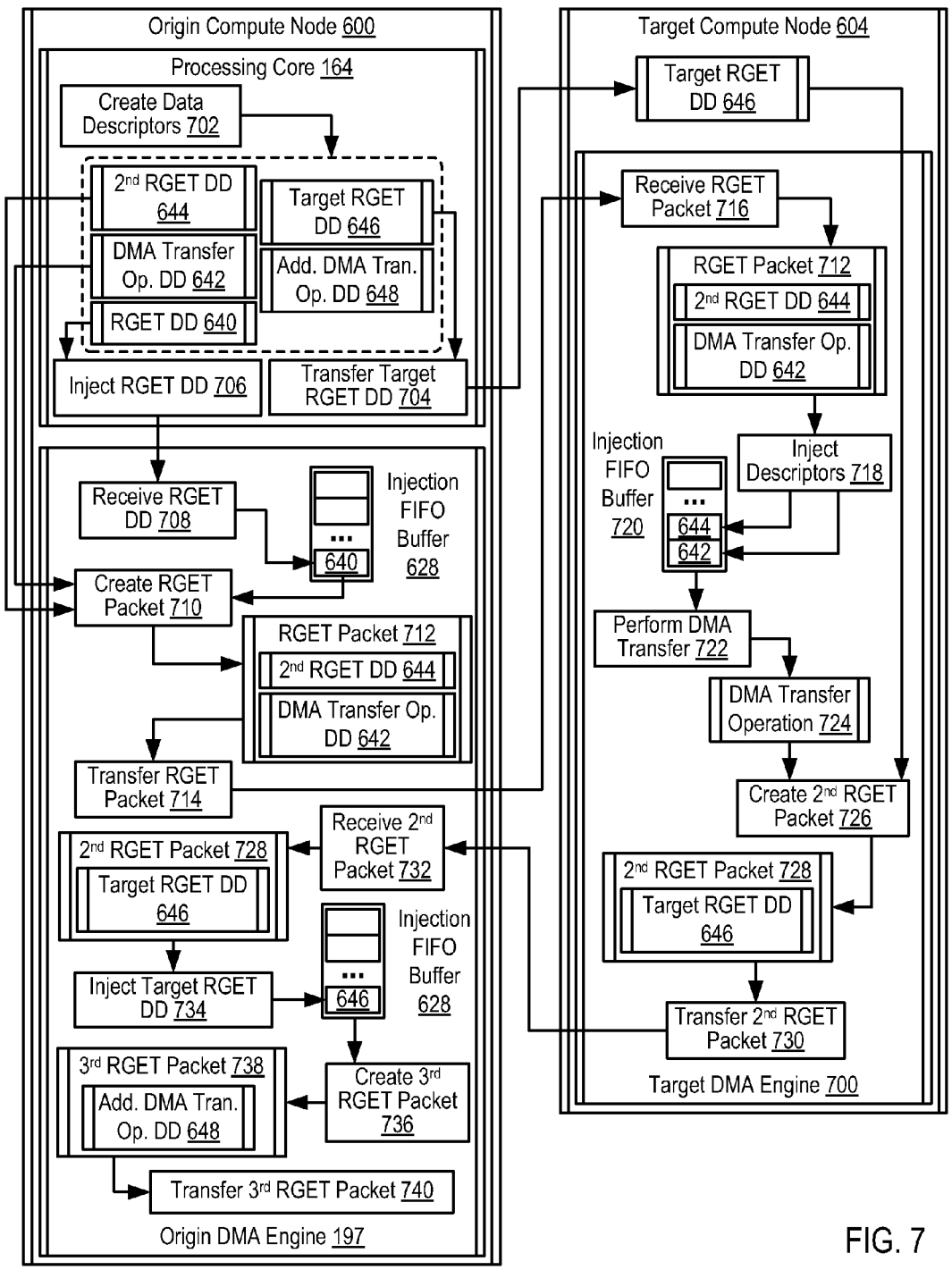
FIG. 7 sets forth a flow chart illustrating an exemplary method for chaining DMA data transfer operations for compute nodes in a parallel computer according to the present invention.

For further explanation, FIG. 7 sets forth a flow chart illustrating an exemplary method for chaining DMA data transfer operations for compute nodes in a parallel computer according to the present invention. The method of FIG. 7 includes creating (702), by a processing core (164) on an origin compute node (600), data descriptors (640, 642, 644, 646, 648). The data descriptors (640, 642, 644, 646, 648) are used to form a chain of DMA transfer operations. In the example of FIG. 7, the DMA transfer operations chain formed by the data descriptors (640, 642, 644, 646, 648) includes two DMA transfer operations that transfer data from the target compute node (604) to the origin compute node (600).

In the example of FIG. 7, the data descriptors (640, 642, 644, 646, 648) created by the processing core (164) include a remote get ('RGET') data descriptor (640), a DMA transfer operation data descriptor (642), a second RGET data descriptor (644), a target RGET data descriptor (646), and an additional DMA transfer operation data descriptor (648). The RGET data descriptor (640) specifies the DMA transfer operation data descriptor (642) on the origin compute node (600) and the second RGET data descriptor (644) on the origin compute node (600) as the payload for an RGET packet created according to the RGET data descriptor (640). In such a manner, the RGET data descriptor (640) specifies a remote get operation that injects the DMA transfer operation data descriptor (642) and the second RGET data descriptor (644) in a target injection FIFO buffer (720) on a target compute node (604).

The DMA transfer operation data descriptor (642) of FIG. 7 specifies the first DMA transfer operation in the DMA transfer operations chain. The DMA transfer operation data descriptor (642) of FIG. 7 typically specifies a memory FIFO operation or a direct put operation for transferring data from the target compute node (604) to the origin compute node (600).

The second RGET data descriptor (644) of FIG. 7 specifies the target RGET data descriptor (646) on the target compute node (604) as the payload for an RGET packet created according to the second RGET data descriptor (644). In such a manner, the second RGET data descriptor (644) specifies a remote get operation that injects the target RGET data descriptor (646) in the origin injection FIFO buffer (628) on the origin compute node (600).

The target RGET data descriptor (646) of FIG. 7 specifies the additional DMA transfer operation data descriptor (648) on the origin compute node (600) as the payload for an RGET packet created according to the target RGET data descriptor (646). In such a manner, the target RGET data descriptor (646) specifies a remote get operation that injects the additional DMA transfer operation data descriptor (648) in the target injection FIFO buffer (720) on the target compute node (604).

The additional DMA transfer operation data descriptor (648) of FIG. 7 specifies the second DMA transfer operation in the DMA transfer operations chain. The additional DMA transfer operation data descriptor (648) of FIG. 7 typically specifies a memory FIFO operation or a direct put operation for transferring data from the target compute node (604) to the origin compute node (600).

To chain DMA transfer operations according to embodiments of the present invention, the target RGET data descriptor (646) typically resides on the target compute node (604). Because the origin node's processing core (164) created the target RGET data descriptor (646) in the example of FIG. 7, the method of FIG. 7 also includes transferring (704), by the processing core (164) on the origin compute node (600), the target RGET data descriptor (646) to the target compute node (604). The origin node's processing core (164) may transfer (704) the target RGET data descriptor (646) to the target compute node (604) according to the method of FIG. 7 by instructing the origin DMA engine (197) to packetizes the target RGET data descriptor (646) and transmit the packet to the target compute node (604) using a memory FIFO operation or direct put operation. Because the second RGET data descriptor (644) specifies the target RGET data descriptor (646) on the target compute node (604), the processing core (164) may receive the location in computer memory from the target compute node (604) at which the target compute node (604) stored the target RGET data descriptor (646) after transferring (704) the target RGET data descriptor (646) to the target compute node (604). The origin node's processing core (164) may the update the second RGET data descriptor (644) with the storage location for the target RGET data descriptor (646) on the target compute node (604).

After creating (702) the data descriptors (640, 642, 644, 646, 648) and transferring (704) the target RGET data descriptor (646) to the target compute node, the processing core (164) is ready for the DMA engines (197, 700) to begin processing the chain of DMA transfer operations without any further involvement of the processing core (164) until the entire chain of DMA data transfer operations is complete. As mentioned above, the chain of DMA transfer operations in the example of FIG. 7 includes two DMA transfer operations, but readers will note that any number of DMA data transfer operations may be chained for compute nodes in a parallel computer according to embodiments of the present invention.

To initiate processing of the DMA data transfer operation chain by the DMA engines (197, 700), the method of FIG. 7 includes injecting (706), by the processing core (164) on the origin compute node (600), the RGET data descriptor (640) in the origin injection FIFO buffer (628). The origin node's processing core (164) may inject (706) the RGET data descriptor (640) in the origin injection FIFO buffer (628) according to the method of FIG. 7 by executing an API function exposed by a DMA device driver.

The method of FIG. 7 also includes receiving (708), by the origin DMA engine (197) on an origin compute node (600) in the origin injection FIFO buffer (628) for the origin DMA engine (197), the RGET data descriptor (640). The origin DMA engine (197) may receive (708) the RGET data descriptor (640) according to the method of FIG. 7 by storing the RGET data descriptor (640) in the origin injection FIFO buffer (628) and configuring buffer pointers to indicate that the origin injection FIFO buffer (628) contains at least one data descriptor for processing.

The method of FIG. 7 includes creating (710), by the origin DMA engine (197), an RGET packet (712) in dependence upon the RGET data descriptor (640). The origin DMA engine (197) may create (710) the RGET packet (712) according to the method of FIG. 7 by configuring a network packet with the packet header specified in the RGET data descriptor (640) and configuring the DMA transfer operation data descriptor (642) and the second RGET data descriptor (644) as the payload of the network packet. In such a manner, the RGET packet (712) of FIG. 7 contains the DMA transfer operation data descriptor (642) and the second RGET data descriptor (644). Readers will note that only two data descriptors are configured as the payload for the RGET packet (712)—a single RGET data descriptor for specifying a DMA control operation and a single DMA data transfer operation data descriptor for specifying a DMA data transfer operation in the DMA data transfer operations chain. Such a configuration is for explanation and not limitation because network packets often in fact are capable of storing many data descriptors. Storing more than one DMA transfer operation data descriptor in the RGET packet would increase the number of DMA data transfer operations capable of being performed for a given DMA data transfer operations chain.

The method of FIG. 7 includes transferring (714), by the origin DMA engine (197) to a target DMA engine (700) on the target compute node (604), the RGET packet (712). The origin DMA engine (197) may transfer (714) the RGET packet (712) to the target compute node (604) according to the method of FIG. 7 by injecting the RGET packet (712) into the transmission stacks for a network adapter of the origin compute node (600).

The method of FIG. 7 also includes receiving (716), by the target DMA engine (700), the RGET packet (712) from the origin DMA engine (197). The target DMA engine (700) may receive the RGET packet (712) from the origin DMA engine (197) according to the method of FIG. 7 by retrieving the RGET packet (712) from the reception stack for a network adapter of the target compute node (604) and storing the RGET packet (712) in a reception FIFO buffer for the target DMA engine (700).

The method of FIG. 7 includes injecting (718), by the target DMA engine (700), the DMA transfer operation data descriptor (642) and the second RGET data descriptor (644) in the target injection FIFO buffer (720) for the target DMA engine (700). The target DMA engine (700) may inject (718) the DMA transfer operation data descriptor (642) and the second RGET data descriptor (644) in the target injection FIFO buffer (720) according to the method of FIG. 7 by storing the DMA transfer operation data descriptor (642) before the second RGET data descriptor (644) in the target injection FIFO buffer (720) and configuring buffer pointers to indicate that the target injection FIFO buffer (720) contains at least one data descriptor for processing.

The method of FIG. 7 includes performing (722), by the target DMA engine (700), the DMA transfer operation (724) in dependence upon the DMA transfer operation data descriptor (642). The DMA transfer operation (724) of FIG. 7 may represent a memory FIFO data transfer operation or a direct put data transfer operation. The target DMA engine (700) may perform (722) the DMA transfer operation (724) according to the method of FIG. 7 by packetizing the data on the target compute node (604) specified by the DMA transfer operation data descriptor (642) into network packets having a header as specified in the DMA transfer operation data descriptor (642) and transmitting the network packets to the origin compute node (600).

The method of FIG. 7 includes creating (726), by the target DMA engine (700), a second RGET packet (728) in dependence upon the second RGET data descriptor (644). The target DMA engine (700) may create (726) the second RGET packet (728) according to the method of FIG. 7 by configuring a network packet with the packet header specified in the second RGET data descriptor (644) and configuring the target RGET data descriptor (646) as the payload of the network packet. In such a manner, the second RGET packet (728) of FIG. 7 contains the target RGET data descriptor (646).

The method of FIG. 7 also includes transferring (730), by the target DMA engine (700) to the origin DMA engine (197), the second RGET packet (728). The target DMA engine (700) may transfer (730) the second RGET packet (728) to the origin DMA engine (197) according to the method of FIG. 7 by injecting the second RGET packet (728) into the transmission stacks for a network adapter of the target compute node (604).

The method of FIG. 7 includes receiving (732), by the origin DMA engine (197), the second RGET packet (728) from the target DMA engine (700). The origin DMA engine (197) may receive (732) the second RGET packet (728) from the target DMA engine (700) according to the method of FIG. 7 by retrieving the second RGET packet (728) from the reception stack for a network adapter of the origin compute node (600) and storing the second RGET packet (728) in a reception FIFO buffer for the origin DMA engine (197).

The method of FIG. 7 also includes injecting (734), by the origin DMA engine (197), the target RGET data descriptor (646) in the origin injection FIFO buffer (628). The origin DMA engine (197) may inject (734) the target RGET data descriptor (646) in the origin injection FIFO buffer (628) according to the method of FIG. 7 by storing the target RGET data descriptor (646) in the origin injection FIFO buffer (628) and configuring buffer pointers to indicate that the origin injection FIFO buffer (628) contains at least one data descriptor for processing.

The method of FIG. 7 includes creating (736), by the origin DMA engine (197), a third RGET packet (738) in dependence upon the target RGET data descriptor (646). The origin DMA engine (197) may create (736) the third RGET packet (738) according to the method of FIG. 7 by configuring a network packet with the packet header specified in the target RGET data descriptor (646) and configuring the additional DMA transfer operation data descriptor (648) as the payload of the network packet. In such a manner, the third RGET packet (738) of FIG. 7 contains the additional DMA transfer operation data descriptor (648) specifying an additional DMA transfer operation to be performed by the target DMA engine (700).

The method of FIG. 7 includes transferring (740), by the origin DMA engine (197) to the target DMA engine (700), the third RGET packet (738). The origin DMA engine (197) may transfer (740) the third RGET packet (738) to the target DMA engine (700) by injecting the third RGET packet (738) into the transmission stacks for a network adapter of the origin compute node (600). Upon receiving the third RGET packet (738), the target DMA engine (700) of FIG. 7 may inject the additional DMA transfer operation data descriptor (648) into the target injection FIFO buffer (720) and perform the additional DMA transfer operation. Because no more DMA data transfer operations are included in the DMA data transfer operation chain, each DMA engine (197, 700) notifies its respective processing core that the last DMA data transfer operation is complete.

Figure 8:
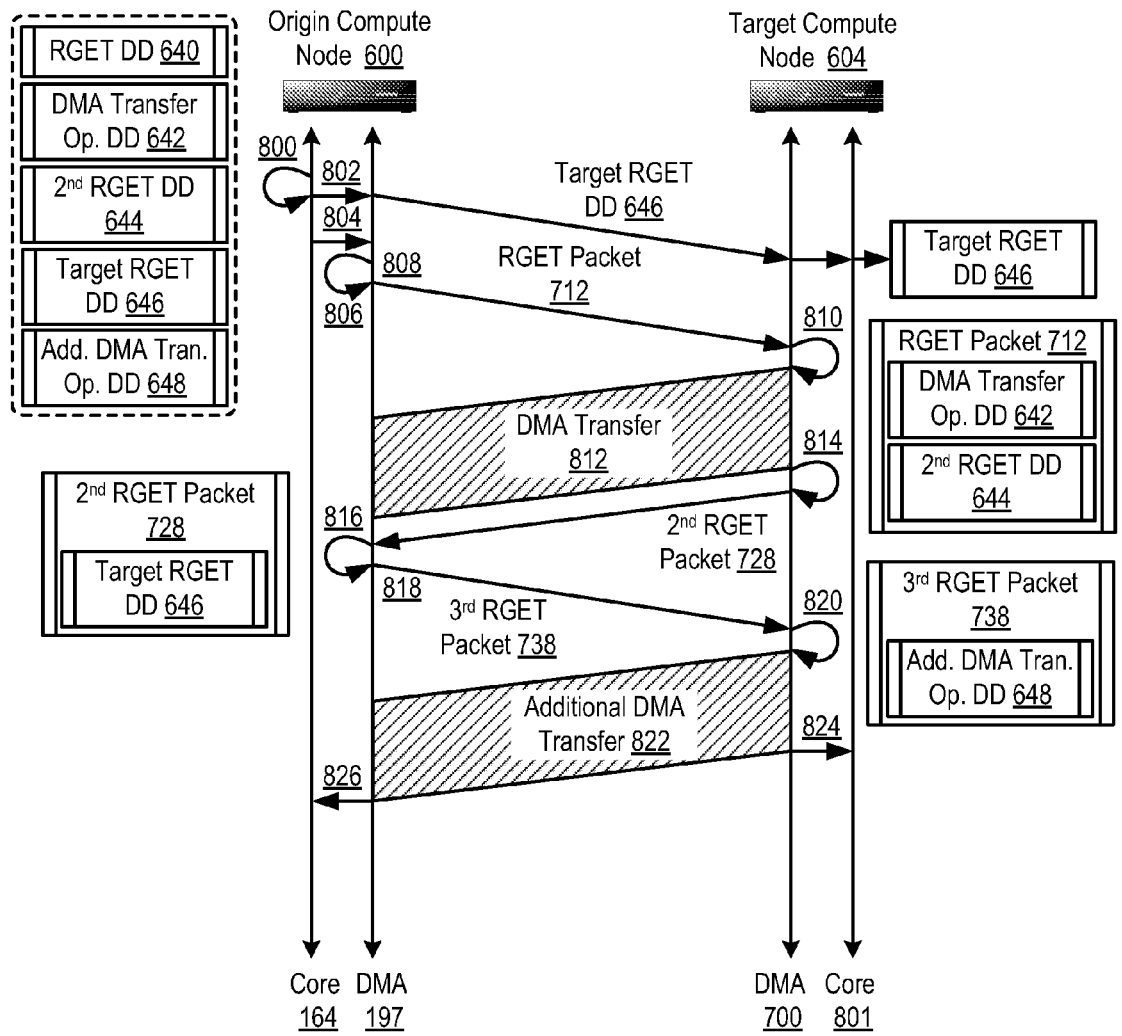
FIG. 8 sets forth a call sequence diagram illustrating an exemplary call sequence for chaining DMA data transfer operations for compute nodes in a parallel computer according to the present invention.

For further explanation, FIG. 8 sets forth a call sequence diagram illustrating an exemplary call sequence for chaining DMA data transfer operations for compute nodes in a parallel computer according to the present invention. The exemplary call sequence diagram includes an origin compute node (600) and a target compute node (604). The origin compute node (600) includes a processing core (164) and an origin DMA engine (197). The target compute node (604) includes a processing core (801) and a target DMA engine (700).

In the exemplary call sequence diagram of FIG. 8, the origin node's processing core (164) creates (800) data descriptors (640, 642, 644, 646, 648) used to form a DMA transfer operations chain that includes two DMA data transfers (812, 822). In the example of FIG. 8, the data descriptors (640, 642, 644, 646, 648) created by the processing core (164) include a remote get ('RGET') data descriptor (640), a DMA transfer operation data descriptor (642), a second RGET data descriptor (644), a target RGET data descriptor (646), and an additional DMA transfer operation data descriptor (648). The RGET data descriptor (640) specifies the DMA transfer operation data descriptor (642) on the origin compute node (600) and the second RGET data descriptor (644) on the origin compute node (600) as the payload for an RGET packet created according to the RGET data descriptor (640). In such a manner, the RGET data descriptor (640) specifies a remote get operation that injects the DMA transfer operation data descriptor (642) and the second RGET data descriptor (644) in a target injection FIFO buffer on a target compute node (604).

The DMA transfer operation data descriptor (642) of FIG. 8 specifies the first DMA transfer operation (812) in the DMA transfer operations chain. The DMA transfer operation data descriptor (642) of FIG. 8 typically specifies a memory FIFO operation or a direct put operation for transferring data from the target compute node (604) to the origin compute node (600).

The second RGET data descriptor (644) of FIG. 8 specifies the target RGET data descriptor (646) on the target compute node (604) as the payload for an RGET packet created according to the second RGET data descriptor (644). In such a manner, the second RGET data descriptor (644) specifies a remote get operation that injects the target RGET data descriptor (646) in the origin injection FIFO buffer on the origin compute node (600).

The target RGET data descriptor (646) of FIG. 8 specifies the additional DMA transfer operation data descriptor (648) on the origin compute node (600) as the payload for an RGET packet created according to the target RGET data descriptor (646). In such a manner, the target RGET data descriptor (646) specifies a remote get operation that injects the additional DMA transfer operation data descriptor (648) in the target injection FIFO buffer on the target compute node (604).

The additional DMA transfer operation data descriptor (648) of FIG. 8 specifies an additional DMA transfer operation (822) in the DMA transfer operations chain. The additional DMA transfer operation data descriptor (648) of FIG. 8 typically specifies a memory FIFO operation or a direct put operation for transferring data from the target compute node (604) to the origin compute node (600).

To chain DMA transfer operations according to embodiments of the present invention, the target RGET data descriptor (646) typically resides on the target compute node (604). Because the origin node's processing core (164) created the target RGET data descriptor (646) in the example of FIG. 8, the origin node's processing core (164) transfers (802) the target RGET data descriptor (646) to the target compute node (604).

After creating (800) the data descriptors (640, 642, 644, 646, 648) and transferring (802) the target RGET data descriptor (646) to the target compute node, the processing core (164) is ready for the DMA engines (197, 700) to begin processing the chain of DMA transfer operations without any further involvement of the processing core (164) until the entire chain of DMA transfer operations is complete. In the exemplary call sequence diagram of FIG. 8, the origin node's processing core (164) injects (804) the RGET data descriptor (640) in the origin injection FIFO buffer for the origin DMA engine (197).

In the exemplary call sequence diagram of FIG. 8, the origin DMA engine (197) receives (806) the RGET data descriptor (640) in an origin injection FIFO buffer and creates (806) an RGET packet (712) in dependence upon the RGET data descriptor (640). The RGET packet (712) of FIG. 8 contains the DMA transfer operation data descriptor (642) and the second RGET data descriptor (644) and is used to inject the DMA transfer operation data descriptor (642) and the second RGET data descriptor (644) in a target injection FIFO buffer on the target compute node (604). The origin DMA engine (197) of FIG. 8 then transfers (808) the RGET packet (712) to the target DMA engine (700).

In the exemplary call sequence diagram of FIG. 8, the target DMA engine (700) receives (810) the RGET packet (712) and injects (810) the DMA transfer operation data descriptor (642) and the second RGET data descriptor (644) in a target injection FIFO buffer for the target DMA engine (700). The target DMA engine (700) then performs (810) the DMA data transfer operation (812) in dependence upon the DMA transfer operation data descriptor (642).

The target DMA engine (700) of FIG. 8 continues by creating (814) a second RGET packet (728) in dependence upon the second RGET data descriptor (644) and transferring (814) the second RGET packet (728) to the origin DMA engine (197). The second RGET packet (728) of FIG. 8 contains the target RGET data descriptor (646) and is used to inject the target RGET data descriptor (646) in an origin injection FIFO buffer for the origin DMA engine (197).

In the exemplary call sequence diagram of FIG. 8, the origin DMA engine (197) receives (816) the second RGET packet (728) from the target DMA engine (700) and injects (816) the target RGET data descriptor (646) in the origin injection FIFO buffer for the origin DMA engine (197). The origin DMA engine (197) of FIG. 8 then creates (816) a third RGET packet (738) in dependence upon the target RGET data descriptor (646). The third RGET packet (738) in the example of FIG. 8 contains the additional DMA transfer operation data descriptor (648), which specifies an additional DMA transfer operation (822) to be performed by the target DMA engine (700). The third RGET packet (738) of FIG. 8 is used to inject the additional DMA transfer operation data descriptor (648) into a target injection FIFO buffer for the target DMA engine (700). The origin DMA engine (197) of FIG. 8 then transfers (818) the third RGET packet (738) to the target DMA engine (700).

In the exemplary call sequence diagram of FIG. 8, the target DMA engine (700) receives (820) the third RGET packet (738) and injects (820) the additional DMA transfer operation data descriptor (648) in a target injection FIFO buffer for the target DMA engine (700). The target DMA engine (700) then performs (820) the DMA transfer operation (822) in dependence upon the additional DMA transfer operation data descriptor (648).

After the target DMA engine (700) performs (820) the DMA transfer operation (822), the target DMA engine (700) of FIG. 8 notifies (824) the processing core (801) on the target compute node (604) that the last data transfer operation in the DMA data transfer operations chain is complete. Similarly, after the origin DMA engine (197) receives the data from the DMA data transfer operation (822), the origin DMA engine (197) of FIG. 8 notifies (826) the processing core (164) on the origin compute node (600) that the last data transfer operation in the DMA data transfer operations chain is complete.

Exemplary embodiments of the present invention are described largely in the context of a fully functional computer system for chaining DMA data transfer operations for compute nodes in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for chaining Direct Memory Access ('DMA') data transfer operations for compute nodes in a parallel computer, the method comprising:
    receiving, by an origin DMA engine on an origin compute node in an origin injection First-In-First-Out ('FIFO') buffer for the origin DMA engine, a remote get ('RGET') data descriptor that specifies a DMA transfer operation data descriptor on the origin compute node and a second RGET data descriptor on the origin compute node, the second RGET data descriptor specifying a target RGET data descriptor on the target compute node, the target RGET data descriptor specifying an additional DMA transfer operation data descriptor on the origin compute node;
    creating, by the origin DMA engine, an RGET packet in dependence upon the RGET data descriptor, the RGET packet containing the DMA transfer operation data descriptor and the second RGET data descriptor; and
    transferring, by the origin DMA engine to a target DMA engine on the target compute node, the RGET packet.

2. The method of claim 1 further comprising:
    receiving, by the target DMA engine, the RGET packet;
    injecting, by the target DMA engine, the DMA transfer operation data descriptor and the second RGET data descriptor in a target injection FIFO buffer for the target DMA engine;
    performing, by the target DMA engine, the DMA transfer operation in dependence upon the DMA transfer operation data descriptor;
    creating, by the target DMA engine, a second RGET packet in dependence upon the second RGET data descriptor, the second RGET packet containing the target RGET data descriptor; and
    transferring, by the target DMA engine to the origin DMA engine, the second RGET packet.

23

3. The method of claim 2 further comprising:
receiving, by the origin DMA engine, the second RGET packet;
injecting, by the origin DMA engine, the target RGET data descriptor in the origin injection FIFO buffer;
creating, by the origin DMA engine, a third RGET packet in dependence upon the target RGET data descriptor, the third RGET packet containing the additional DMA transfer operation data descriptor specifying an additional DMA transfer operation to be performed by the target DMA engine; and
transferring, by the origin DMA engine to the target DMA engine, the third RGET packet.

4. The method of claim 1 further comprising:
creating, by a processing core on the origin compute node, the RGET data descriptor; and
injecting, by the processing core on the origin compute node, the RGET data descriptor in the origin injection FIFO buffer.

5. The method of claim 1 further comprising:
creating, by a processing core on the origin compute node, the target RGET data descriptor specifying the additional DMA transfer operation data descriptor; and
transferring, by the processing core on the origin compute node, the target RGET data descriptor to the target compute node.

6. The method of claim 1 wherein the origin compute node and the target compute node are comprised in a parallel computer, the parallel computer comprising a plurality of compute nodes connected for data communications through the data communications network, the data communications network optimized for point to point data communications.

7. A system for chaining Direct Memory Access ('DMA') data transfer operations for compute nodes in a parallel computer, the system comprising an origin compute node and a target compute node, each compute node comprising one or more computer processors, a DMA controller, a DMA engine installed upon the DMA controller, and computer memory operatively coupled to the computer processors, the DMA controller, and the DMA engine, the computer memory for the origin compute node having disposed within it computer program instructions capable of:
receiving, by an origin DMA engine on an origin compute node in an origin injection First-In-First-Out ('FIFO') buffer for the origin DMA engine, a remote get ('RGET') data descriptor that specifies a DMA transfer operation data descriptor on the origin compute node and a second RGET data descriptor on the origin compute node, the second RGET data descriptor specifying a target RGET data descriptor on the target compute node, the target RGET data descriptor specifying an additional DMA transfer operation data descriptor on the origin compute node;
creating, by the origin DMA engine, an RGET packet in dependence upon the RGET data descriptor, the RGET packet containing the DMA transfer operation data descriptor and the second RGET data descriptor, and
transferring, by the origin DMA engine to a target DMA engine on the target compute node, the RGET packet.

8. The system of claim 7 wherein the computer memory for the target compute node has disposed within it computer program instructions capable of:
receiving, by the target DMA engine, the RGET packet;
injecting, by the target DMA engine, the DMA transfer operation data descriptor and the second RGET data descriptor in a target injection FIFO buffer for the target DMA engine;

performing, by the target DMA engine, the DMA transfer operation in dependence upon the DMA transfer operation data descriptor,
creating, by the target DMA engine, a second RGET packet in dependence upon the second RGET data descriptor, the second RGET packet containing the target RGET data descriptor, and
transferring, by the target DMA engine to the origin DMA engine, the second RGET packet.

9. The system of claim 8 wherein the computer memory for the origin compute node also has disposed within it computer program instructions capable of:
receiving, by the origin DMA engine, the second RGET packet;
injecting, by the origin DMA engine, the target RGET data descriptor in the origin injection FIFO buffer;
creating, by the origin DMA engine, a third RGET packet in dependence upon the target RGET data descriptor, the third RGET packet containing the additional DMA transfer operation data descriptor specifying an additional DMA transfer operation to be performed by the target DMA engine; and
transferring, by the origin DMA engine to the target DMA engine, the third RGET packet.

10. The system of claim 7 wherein the computer memory for the origin compute node also has disposed within it computer program instructions capable of:
creating, by a processing core on the origin compute node, the RGET data descriptor, and
injecting, by the processing core on the origin compute node, the RGET data descriptor in the origin injection FIFO buffer.

11. The system of claim 7 wherein the computer memory for the origin compute node also has disposed within it computer program instructions capable of:
creating, by a processing core on the origin compute node, the target RGET data descriptor specifying the additional DMA transfer operation data descriptor; and
transferring, by the processing core on the origin compute node, the target RGET data descriptor to the target compute node.

12. The system of claim 7 wherein the origin compute node and the target compute node are comprised in a parallel computer, the parallel computer comprising a plurality of compute nodes connected for data communications through the data communications network, the data communications network optimized for point to point data communications.

13. A computer program product for chaining Direct Memory Access ('DMA') data transfer operations for compute nodes in a parallel computer, the computer program product disposed upon a computer readable recordable medium, the computer program product comprising computer program instructions capable of:
receiving, by an origin DMA engine on an origin compute node in an origin injection First-In-First-Out ('FIFO') buffer for the origin DMA engine, a remote get ('RGET') data descriptor that specifies a DMA transfer operation data descriptor on the origin compute node and a second RGET data descriptor on the origin compute node, the second RGET data descriptor specifying a target RGET data descriptor on the target compute node, the target RGET data descriptor specifying an additional DMA transfer operation data descriptor on the origin compute node;
creating, by the origin DMA engine, an RGET packet in dependence upon the RGET data descriptor, the RGET packet containing the DMA transfer operation data descriptor and the second RGET data descriptor, and transferring, by the origin DMA engine to a target DMA engine on the target compute node, the RGET packet.

14. The computer program product of claim 13 further comprising computer program instructions capable of:

receiving, by the target DMA engine, the RGET packet;

injecting, by the target DMA engine, the DMA transfer operation data descriptor and the second RGET data descriptor in a target injection FIFO buffer for the target DMA engine;

performing, by the target DMA engine, the DMA transfer operation in dependence upon the DMA transfer operation data descriptor;

creating, by the target DMA engine, a second RGET packet in dependence upon the second RGET data descriptor, the second RGET packet containing the target RGET data descriptor; and transferring, by the target DMA engine to the origin DMA engine, the second RGET packet.

15. The computer program product of claim 14 further comprising computer program instructions capable of:

receiving, by the origin DMA engine, the second RGET packet;

injecting, by the origin DMA engine, the target RGET data descriptor in the origin injection FIFO buffer;

creating, by the origin DMA engine, a third RGET packet in dependence upon the target RGET data descriptor, the third RGET packet containing the additional DMA transfer operation data descriptor specifying an additional DMA transfer operation to be performed by the target DMA engine; and transferring, by the origin DMA engine to the target DMA engine, the third RGET packet.

16. The computer program product of claim 13 further comprising computer program instructions capable of:

creating, by a processing core on the origin compute node, the RGET data descriptor, and injecting, by the processing core on the origin compute node, the RGET data descriptor in the origin injection FIFO buffer.

17. The computer program product of claim 13 further comprising computer program instructions capable of:

creating, by a processing core on the origin compute node, the target RGET data descriptor specifying the additional DMA transfer operation data descriptor, and transferring, by the processing core on the origin compute node, the target RGET data descriptor to the target compute node.

18. The computer program product of claim 13 wherein the origin compute node and the target compute node are comprised in a parallel computer, the parallel computer comprising a plurality of compute nodes connected for data communications through the data communications network, the data communications network optimized for point to point data communications.

* * * * *